M. F. WILLIAMS.
PULLEY.
APPLICATION FILED AUG. 19, 1920.

1,423,476.

Patented July 18, 1922.

Inventor
Milton F. Williams

By H. M. Plaisted
Attorney

UNITED STATES PATENT OFFICE.

MILTON F. WILLIAMS, OF ST. LOUIS, MISSOURI, ASSIGNOR OF FORTY-NINE ONE-HUNDREDTHS TO HAROLD M. PLAISTED, OF ST. LOUIS, MISSOURI.

PULLEY.

1,423,476.

Specification of Letters Patent.

Patented July 18, 1922.

Application filed August 19, 1920. Serial No. 404,564.

*To all whom it may concern:*

Be it known that I, MILTON F. WILLIAMS, a citizen of the United States, residing at St. Louis, State of Missouri, have invented certain new and useful Improvements in Pulleys, of which the following is a specification.

This invention relates to certain new and useful improvements in pulleys, the peculiarities of which will be fully described and claimed.

The main object of my invention is to provide a pulley having transverse grooves of such form that one edge or face will be but slightly inclined to the direction of motion so as to avoid or reduce the whistling sound when run at high speed; and second, to improve the contact of a high speed belt and pulley by discharging laterally the cushioned air taken in between the belt and pulley.

Figure 1:
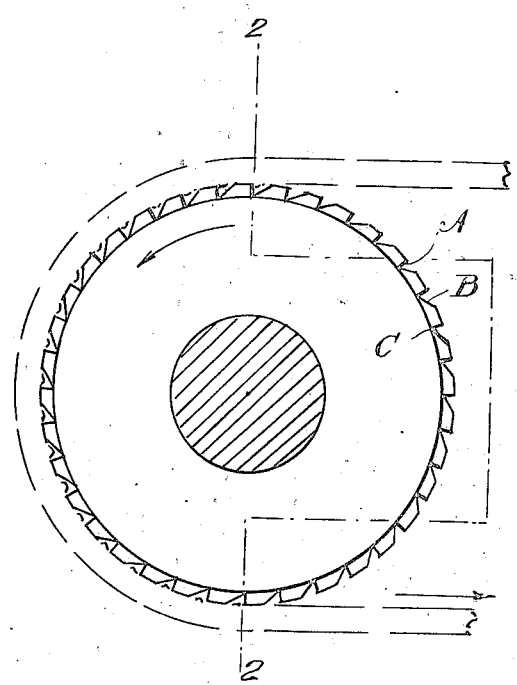
Figure 2:
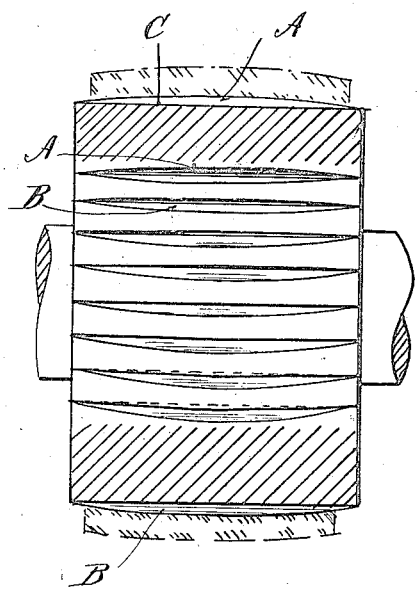
Figure 3:
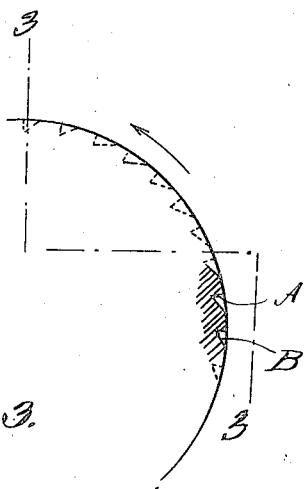

In the accompanying drawing on which like reference letters indicate corresponding parts, Fig. 1 repesents a side elevation of a crown-faced pulley exemplifying my invention; Fig. 2 a partial face view and partial sectional view on the line 2—2 of Fig. 1; Fig. 3, a straight-faced pulley provided with my transverse grooves; and Fig. 4, a partial face view and partial section on the line 3—3 of Fig. 3.

Various forms of pulleys have been made by which the cushioned air between the belt and the pulley is removed or discharged in order to effect better contact of belt and pulley face. Such pulleys are perforated or serrated and such serrations when the pulley is run at high speed, produce a whistling or humming sound that is often objectionable. In my form of pulley however, I provide a groove, one face of which is inclined backward with respect to the direction of rotation, so that it is nearly tangential to the pulley face and does not present a sharp edge, as in other pulleys, to the air that is adjacent to the pulley.

Referring to the drawing, Figs. 1 and 2 show a crown-faced pulley with a belt, indicated as passing over the pulley. Transverse grooves are formed in the face of this pulley, which grooves are practically acute, the front face A of each groove being part of a radial plane through the center of the pulley, while the rear face B is inclined backwards with regard to the rotation of the pulley as indicated by the arrow, so as to present no sharp edge to split the air under high speed and cause a whistling sound.

When the grooves are formed on a crown-faced pulley by a slotting machine or other means acting parallel to the shaft, the bottom C of said groove is straight as shown in Fig. 2. On account of the crowning of the face, such a transverse groove is deepest at the middle of the face, and tapers off in both directions toward the rim edges where it vanishes or disappears and leaves the rim edge plain and ungrooved.

Likewise the circumferential width of each groove is widest or greatest in dimension at the middle of the pulley face, and tapers off toward each rim as shown in the face view Fig. 2.

The normal face of the pulley left between the grooves is preferably more than the face cut out by said grooves.

Figure 4:
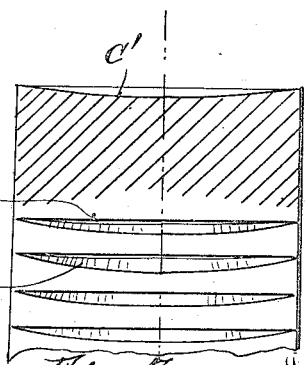

The front face of each groove joins the normal crowned-face of the pulley with a square edge, preferably, but this edge being not presented to the air will not act to produce a humming or whistling sound. Also the belt being nearly as wide as the pulley face, and the grooves being at a minimum outside of the belt edge, very little of the grooves are presented to the air. It is known that in saws, especially the circular kind, the sharp teeth cut the air and produce the sound; and with this form of pulley the edge is smooth at the rims and is practically covered by the belt and the rear edge of each groove slants backward so that the humming sound is reduced to a minimum or done away with entirely. In my form of grooves as just described, the width of the grooves is greatest near the middle of the pulley face, and the grooves taper to both rims. In Figs. 3 and 4 I have shown a straight-faced pulley; the grooves are likewise wider and deeper at the middle of the pulley face as in a crown-face pulley, but the bottom of the groove in a straight-faced pulley is curved as shown C' in Fig. 4 in order to produce the tapering effect toward the rims as described for the crown-faced pulley.

As evidence of the increased efficiency of such a grooved pulley as above described, I can state that actual tests showed that an 8″ x 6½ plain pulley driven at 3000 R. P. M. took up a pull of 147 pounds from a 6″ 4 ply canvas rubber belt, while the same size pulley grooved as above described and driven as indicated took up a pull of 245 pounds,—an increase of 98 pounds or 66% greater efficiency than a plain face pulley.

I claim:

1. A high speed pulley provided with transverse grooves that are radially deeper in the middle of the pulley face than near the rim edges, and one face of which grooves is inclined backward in the direction of rotation, substantially as described.

2. A high speed pulley provided with transverse grooves that are radially deeper and wider in the middle of the pulley face than near the rim edges, substantially as descibed.

3. A high speed pulley provided with transverse grooves formed by radial planes at one face of said grooves and inwardly inclined planes at the other faces, the normal face of the pulley left between the respective grooves for belt contact being greater than the face cut out by said groove, substantially as described.

4. A high speed pulley provided with transverse grooves that are deepest and widest at the middle of the pulley face and taper off toward each rim edge.

5. A high speed crown-faced pulley provided with transverse grooves that are deepest and widest at the middle of the pulley face and taper off to each rim edge, the bottom being parallel to the axis of the pulley.

6. A high speed pulley provided with transverse grooves that are deepest and widest at the middle of the pulley face and diminish in depth and width towards the rims,—the rim edges remaining ungrooved. substantially as shown and described.

In testimony whereof I have affixed my signature.

MILTON F. WILLIAMS.